Oct. 27, 1936.  S. G. MURRAY  2,059,174
AUTOMATIC MEASURING AND WEIGHING MACHINE
Filed Jan. 28, 1935  5 Sheets-Sheet 1

Inventor
Stanley G. Murray
By Norris + Bateman
Attorneys

Oct. 27, 1936.  S. G. MURRAY  2,059,174
AUTOMATIC MEASURING AND WEIGHING MACHINE
Filed Jan. 28, 1935  5 Sheets-Sheet 2

Inventor
Stanley G. Murray
By Norris & Bateman
Attorneys

Patented Oct. 27, 1936

2,059,174

UNITED STATES PATENT OFFICE 2,059,174

AUTOMATIC MEASURING AND WEIGHING MACHINE

Stanley G. Murray, Passaic, N. J., assignor to Richardson Scale Company, Clifton, N. J., a corporation of New Jersey Application January 28, 1935, Serial No. 3,848

16 Claims. (Cl. 249—2)

The present invention relates to load measuring and weighing machines and more especially to those of the automatic type adapted for use in arriving at the weight of loose materials of various kinds such for example as grains, feeds, coal, sand, minerals and the like.

One of the primary objects of the invention is to enable such material to be measured and weighed rapidly and accurately while the material is traveling or being advanced from a suitable supply to a point of discharge, it providing a feeding conveyer having means for advancing it intermittently through a definite distance to measure a predetermined load of the material and a weighing conveyer which receives the loads of material from the feeding conveyer and weighs such loads while they continue to advance before any portions thereof are discharged, means being provided to enlarge or reduce the volume of a measured load if the preceding load on the weighing conveyer is found to be too light or too heavy.

Another object is to provide means embodied in the machine itself for checking the weights of the loads passing therethrough.

Another object is to provide means for indicating the correctness or incorrectness of the weights of the loads as they are passing through the machine.

Another object is to provide novel and efficient means for advancing the feeding conveyer intermittently through definite distances to feed loads of predetermined volume to the weighing conveyer while the latter advances continuously.

A further object is to provide means whereby the volume of the loads measured by the feeding conveyer may be enlarged or reduced to bring the loads to the correct weight while the loads are passing through the machine, thus rendering it unnecessary to interrupt the operation of the machine to effect such adjustments.

Further objects of the invention are to provide novel and efficient means whereby the volumes and weights of the loads may with facility be varied within very wide limits, and to interrupt the feed of material through the machine whenever desired, as when the machine is one of a battery of machines employed for mixing or blending materials in different proportions, and to provide other improvements as will hereinafter appear.

To these and other ends, the invention consists in certain improvements and combinations and arrangements of parts all as will be hereinafter more fully described, the features of novelty being pointed out particularly in the claims at the end of this specification.

In the accompanying drawings.

Similar parts are designated by the same reference characters in the different figures.

Machines embodying the present invention may be used to measure predetermined loads of materials of various kinds which are loose or flowable, such for example as grains, feeds, coal, sand and the like, and to check-weigh such loads whereby accuracy of weight of the loads may be produced and maintained. The preferred embodiment of the invention is shown in the accompanying drawings and will be hereinafter described in detail but it is to be understood that the invention is not restricted to the precise construction shown since equivalent constructions are contemplated and such will be included within the scope of the claims.

The machine, as shown in the present instance, is constructed of suitably assembled units comprising generally a main frame 1, a feed hopper 2, a feed conveyer 3, a weighing conveyer 4 and a drive supporting unit 5.

The main frame unit 1 comprises preferably a pair of channel irons 10 which serve to support the machine when installed, the ends of these channel irons resting for example upon a pair of cross beams 11, the main frame having a sub-frame 12 which is suspended from the channel irons 10 and serves to support certain parts of the machine, as will hereinafter appear.

The feed hopper unit 2 comprises a pair of vertical side plates 15, an inclined front plate 16 and a rear plate 17 which is inclined at a greater angle than the front plate. The side plates 15 are supported from the channel irons 10, and buttresses 18 extending between the latter and the side plates serve to support the side plates rigidly in upright position. The inlet opening at the upper end of the feed hopper, which is relatively large, may be surrounded by an attachment strip 19, which may be of wood or other suitable material and provides means for the attachment of a bin 20 or the like for supplying material to the machine. The large size of the inlet opening of the feed hopper insures feed of the material without arching or choking.

The flow of the material from the feed hopper is governed or controlled by a feed gate 21 which extends across the width of the feed hopper and is mounted on a shaft 22 which is journalled at its ends in the side plates 15. This feed gate is provided with a peripheral face 23, the upper portion of which is concentric with the axis of the shaft 20 so that it will maintain a relatively close fit against the lower edge of the front wall 16 of the feed hopper when the gate is adjusted into different positions, the lower edge of the hopper front wall 16 being preferably bent forwardly to contact with the face 23 of the gate, and the lower portion of the face 23 of the feed gate is preferably curved on a shorter radius than the concentric portion thereof, as indicated at 24 to present a smooth surface to the material passing beneath it as the material is withdrawn from the feed hopper by the feed conveyer, as will hereinafter appear. The mounting of the feed gate 21 at the outlet beneath the lower edge of the front wall 16 of the feed conveyer enables this gate to regulate or govern the amount of material discharged from the feed hopper by adjusting the feed gate into different vertical positions about the axis of the shaft 22, and in order to enable the feed gate to be adjusted with facility, the shaft 22 is provided at one end with a bent arm or crank 25 to which an internally threaded nut 26 is connected pivotally, and a screw shaft 27 is journalled to rotate in a bearing 28 pivotally suspended at 29 to a relatively fixed cross member 30 mounted on a pair of brackets 31 bolted or otherwise fixed to the channel irons 10. One end of the screw shaft is screw threaded into the nut 26 and its other end is provided with a hand wheel by means of which it may be rotated and thereby act through the nut 26 and crank arm 25 to swing the feed gate into different adjusted positions about the axis of the shaft 22 as a center.

Figures 1, 17, 18, 19, 20, 21:
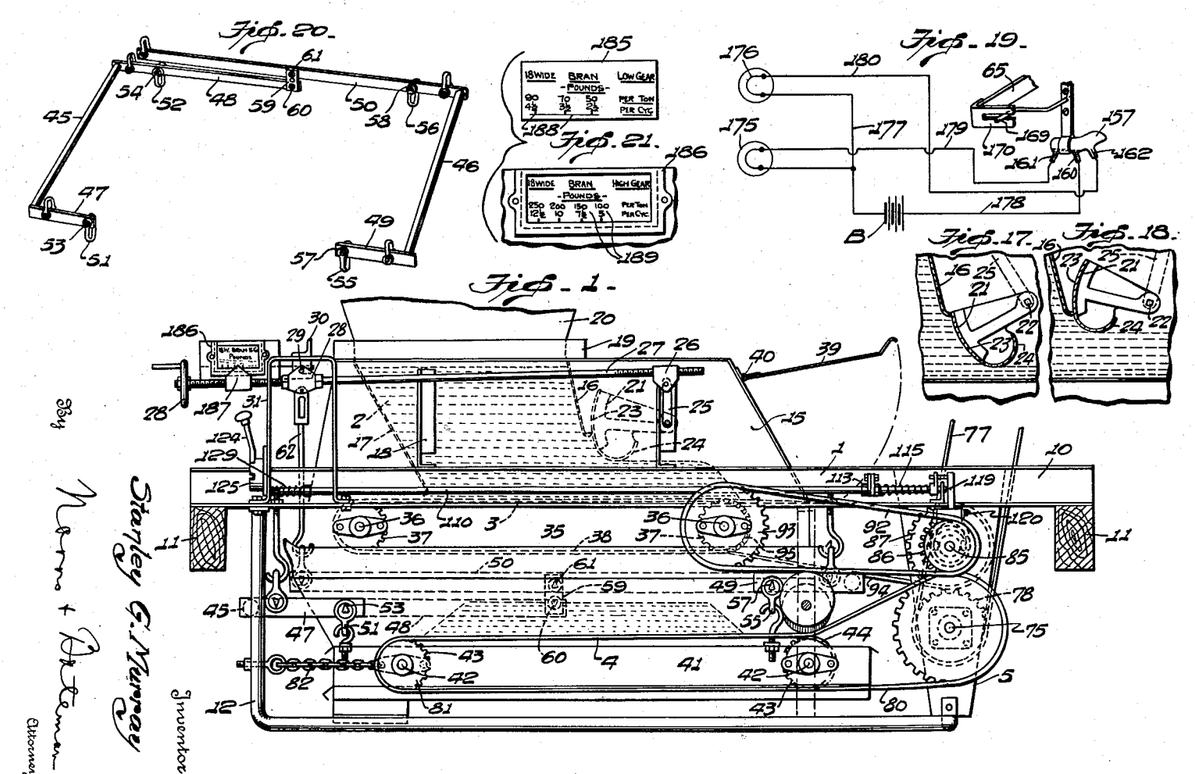
Figure 1 is a side elevation of a load measuring and weighing machine constructed in accordance with the present invention.
Figures 17 and 18 are diagrammatic views illustrating the manner in which the feed gate governs the volume of the material measured by the feed conveyer.
Figure 19 is an electrical diagram showing the circuit for the check weight indicator.
Figure 20 is a perspective view of the scale mechanism which supports the weigh conveyer.
Figure 21 is a detail view of one of the charts or cards for facilitating the setting or adjustment of the machine for materials of different specific gravities and loads of different weights.
Figure 2:
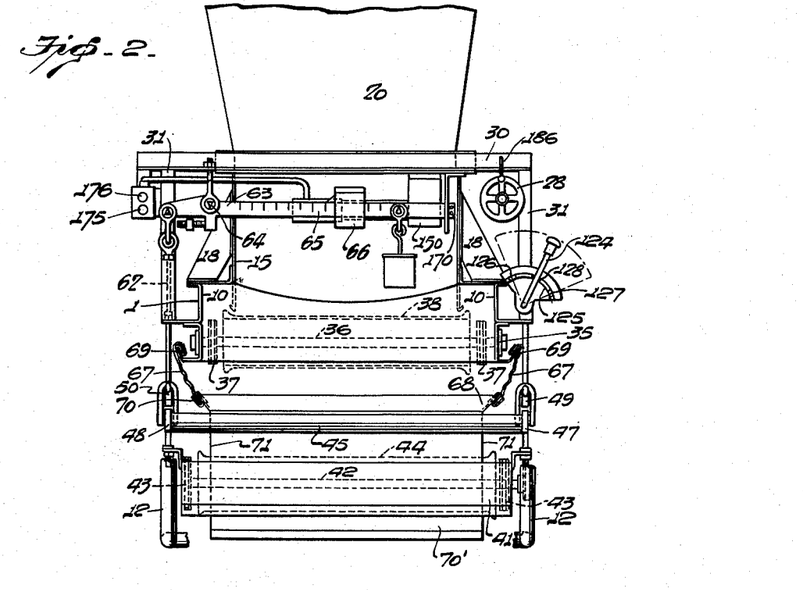
Figure 2 is an end elevation of the machine shown in Fig. 1 as viewed from the left hand end thereof.

The feed conveyer unit of the machine comprises a frame 35 which may be composed of channel shaped side members connected by suitable cross members, this frame being bolted or otherwise secured to the under side of the channel iron members 10 and having a pair of shafts 36 journalled therein, these shafts carrying sprocket wheels 37 over which an endless conveyer 38 of the belt type travels. The conveyer is mounted to travel horizontally or substantially so in the machine and its upper stretch is located immediately below the feed hopper 2, the rear wall 17 of the feed hopper extending downwardly into close proximity to the upper stretch of this conveyer but the lower edge of the front wall 16 of the feed hopper being spaced above the upper surface of the conveyer to provide an outlet opening through which the material may flow from the feed hopper on to this conveyer and travel along therewith, the adjustments of the gate 21 varying its height above the upper stretch of this conveyer and thereby varying the depth of the material withdrawn by the conveyer from the feed hopper. The side walls 15 which define the sides of the feed hopper extend downwardly into close proximity to the upper surface of this conveyer at points near its longitudinal edges, as shown in Fig. 2, in order to prevent overflow of the material at these edges of the conveyer. The side walls 15 preferably extend to the right hand or discharge end of this conveyer as shown in Fig. 1, and a door 39 hinged at 40 is preferably provided to provide access to the upper side of this conveyer adjacent to the feed gate 21, for inspection or other purposes. With the feed hopper, feed conveyer and feed gate arranged as described, movement of the upper stretch of the conveyer 38 toward the right in Fig. 1 will cause this conveyer to withdraw a layer of material from the feed hopper and beneath the feed gate, the depth of this layer of material being controlled or governed by the adjustment of the feed gate.

The weigh conveyer unit 4 is mounted beneath the feed conveyer unit to receive material therefrom, this weigh conveyer unit comprising a suitable frame 41 embodying side members and connecting cross members, this frame having a pair of shafts 42 journalled therein, these shafts having sprocket wheels 43 fixed thereon over which travels an endless conveyer 44 of the belt type. The weigh conveyer 44 is scale supported, preferably from the main frame 10 of the machine, by weighing mechanism which comprises in the present instance a pair of beams 45 and 46, the beam 45 having a short arm 47 at one side of the machine and a long arm 48 rigidly connected thereto and located at the opposite side of the machine, and the beam 46 has a short arm 49 at one side of the machine and a longer arm 50 rigidly connected thereto and located at the opposite side of the machine adjacent to the beam arm 48. One end of the frame 41 is suspended from the weigh beam 45 by clevises 51 and 52 which cooperate with knife edges 53 and 54 respectively on the arms 47 and 48, and the other end of the frame 41 is suspended from the weight beam 46 by clevises 55 and 56 which cooperate with knife edges 57 and 58 respectively on the arms 49 and 50. The arm 50 of the beam 46 which is longer than the arm 48 of the beam 45 is connected to the latter arm by a link 59 which cooperates with knife edges 60 and 61 on the arms 48 and 50 respectively, so that the beams 45 and 46 will support the frame 41 and the conveyer thereon for vertical movements equidistantly at both ends so as to maintain the conveyer in horizontal position. The extremity or free end of the arm 50 of the beam 46 is connected by a link 62 to the short arm of a scale beam 63, the latter being suspended from the knife edges 64 and having on its other arm 65 a sliding weight 66, this arm of the scale beam being provided with graduations to represent weights to suit the size and capacity of the machine, it being understood that when the weigh conveyer 44 is empty or does not contain a full load, the arm 65 of the scale beam will occupy its lowered position, that when said conveyer contains a load equal to the weight for which the sliding weight 66 is set, the arm 65 of the scale beam will come to a poise or midposition, and that when said conveyer contains a load in excess of that for which the weight 66 is set, the arm 65 of the scale beam will occupy an upper or raised position.

In order to prevent the escape of dust or fine material through the space between the weigh conveyer 44 and the feed conveyer 38 above it, a dust confining sleeve 67 composed of canvas or other suitable flexible dust proof material is interposed between a hopper 68 mounted on the weigh conveyer frame 41 and the feed conveyer frame 35, the edges of this sleeve being attached to the hopper 68 and flanges on the frame 35 by S-shaped metal cleats 69 and 70, these cleats pinching double hems formed on the edges of the canvas sleeves and gripping the flanges of the frame 35 and the upper edge of the hopper 68 to detachably retain the dust confining sleeve in place. The hopper 68, which may be of sheet metal, is supported on the weigh conveyer frame 41, and it is provided at one end with a delivery chute 70'. This hopper has side walls 71 which extend downwardly into close proximity to the surface of the upper stretch of the weigh conveyer 44 adjacent to the longitudinal edges thereof, thereby forming skirts which prevent the flow of the material laterally over the longitudinal edges of the weigh conveyer.

According to the present invention, the feed conveyer 38 is driven or advanced intermittently through a definite distance to measure loads of predetermined volume and discharge such loads on to the weigh conveyer 44, and the weigh conveyer is driven continuously and it weighs the loads individually while advancing them to the discharge point or delivery chute 70'. Novel means is provided for so operating the feed and weigh conveyers, such means comprising preferably and as shown in the present instance a main drive shaft 75 journalled in bearings provided in the side members 76 forming part of the drive supporting unit 5, this shaft being driven continuously by a motor or from a line shaft through a sprocket chain 77 and a cooperating sprocket wheel 78 fixed on the shaft 75. Another sprocket wheel 79 fixed on the shaft 75 is connected by a chain 80 to a driving sprocket wheel 81 fixed on one of the shafts 42 for the weigh conveyer so that the latter will be driven continuously from the shaft 75. In order to sustain the lateral pull exerted by the driving chain 80 upon the weigh conveyer unit and avoid any impairment of the accuracy of the weighing operations, a drag link or chain 82 pivotally connects the frame 41 of the weigh conveyer and the sub-frame 12, this drag link or chain extending horizontally or in parallelism with the pull of the driving chain 80 so that the frame 41 of the weigh conveyer will not be displaced laterally by the pull of the driving chain and the vertical weighing movements of the weigh conveyer unit may take place without interference either by the pull of the driving chain or the tension applied thereby to the drag link or chain.

The continuously driven main shaft 75 is connected to a countershaft 85 by an intermittent gear mechanism which causes the countershaft to rotate intermittently to a definite extent at each rotation. The countershaft 85 is connected to the feed conveyer 38 and serves to advance it intermittently, a predetermined or definite distance at each operation, and preferably and as shown in the present instance, means is provided for selectively advancing the feed conveyer through different predetermined distances in order to adapt the machine to the measuring and weighing of loads of different weights.

As shown in the present instance, a pair of sprocket wheels 86 and 87 of different diameters are mounted to rotate freely on the shaft 85, as by ball bearings and are retained thereon by nuts 88 and 89. These sprocket wheels have jaw clutch members 90 and 91 respectively fixed thereto. The relatively smaller sprocket wheel 86 is connected by a chain 92 to a sprocket wheel 93 fixed on one end of one of the shafts 36 of the feed conveyer 38, and the relatively larger sprocket wheel 87 is connected by a chain 94 to a sprocket wheel 95 fixed on the opposite end of said shaft 36 of the feed conveyer, so that the sprocket wheels 86 and 87 of different diameters together with their chains and cooperating sprocket wheels connected to the driving shaft of the feed conveyer provide driving means of different speed ratios.

Figures 11, 12, 13, 15, 16:
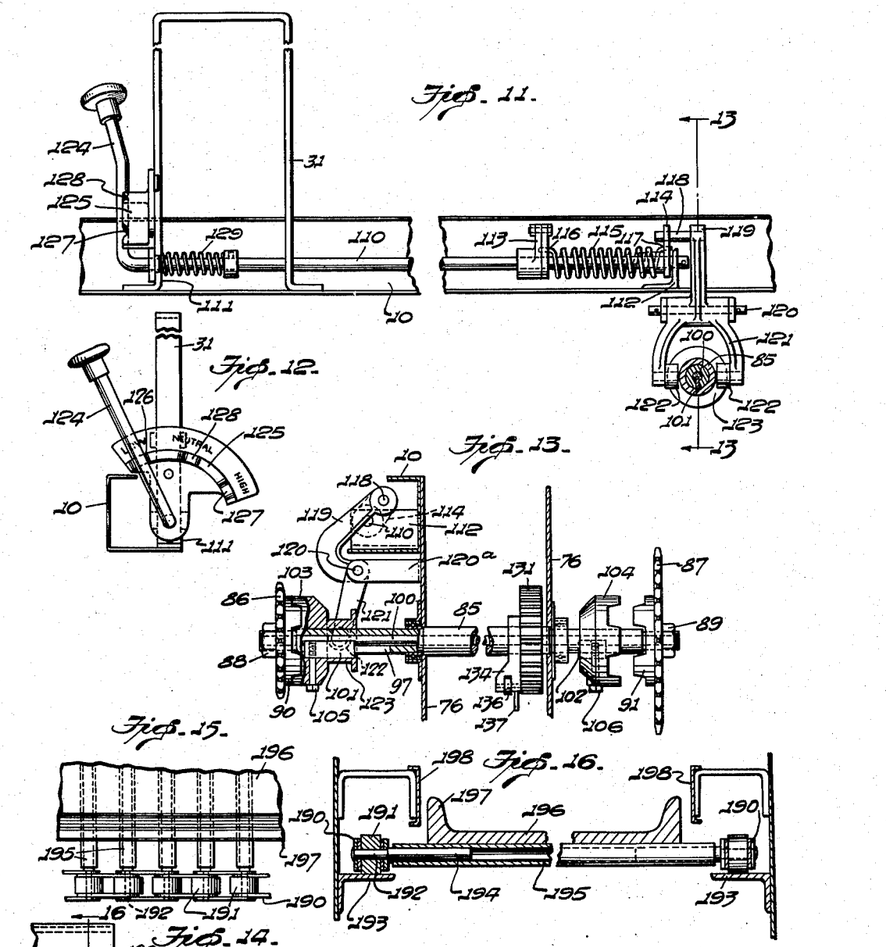
Figure 11 is an enlarged detail view of the control means for the variable speed drive for the feed conveyer.
Figure 12 is an end elevation of the structure shown in Fig. 11 as viewed from the left in that figure.
Figure 13 is a vertical section taken on the line 13—13 in Fig. 11.
Figure 15 is a top plan view of a portion of one of the conveyers.
Figure 16 is a vertical section through the conveyer taken on the line 16—16 in Fig. 14.

The countershaft 85 on which the sprocket wheels 86 and 87 are mounted is hollow, as shown in detail in Fig. 13, and a rod 100 is fitted to reciprocate axially therein. Keys 101 and 102 are fitted into recesses in the rod 100 and these keys are also fitted in recesses in shiftable jaw clutch members 103 and 104 which are complemental to and adapted to cooperate with the jaw clutched members 90 and 91 respectively on the sprockets 86 and 87. The keys 100 and 101 are fixed in the clutch members 103 and 104 by screws 105 and 106. The jaw clutch members 103 and 104 are so positioned on the rod 100 that when the latter is shifted in one direction to engage one of the jaw clutch members 103 or 104 with its cooperating jaw clutch member, as to engage the jaw clutch member 103 with the jaw clutch member 90 as shown in Fig. 13, the other shiftable jaw clutch member will be disengaged from its cooperative jaw clutch member, and when the rod 100 is shifted in the opposite direction, the previously engaged pair of jaw clutch members will be disengaged and the other cooperative pair of jaw clutch members will be engaged. By this arrangement, either the sprocket wheel 86 or the sprocket wheel 87 may be clutched to the shaft 85 by shifting the rod 100 axially thereof in the appropriate direction, thereby causing the shaft 85 to drive the feed conveyer at one or another speed and advancing it through different relative distances. While one of the sprockets 86 or 87 is clutched to the shaft 85, the other of these sprocket wheels is freely revoluble thereon. The keys 101 and 102 slide in axially extending slots 97 in the shaft 85, thus forming splined driving connections between said shaft and the shiftable clutch members 103 and 104.

The control means for the variable speed drive for the feed conveyer provided by the jaw clutches just described is selectively operable by the attendant of the machine, and as best shown in Figs. 11 and 12, it comprises a shaft 110 which is rotatably mounted in bearings provided in brackets 111 and 112 supported on one of the channel members 10. One end of this shaft has a collar 113 fixed thereon and another collar 114 which is mounted loosely thereon, and a coil spring 115 is placed on the shaft 110 so as to encircle it, one end 116 of this spring being connected to the fixed collar 113 and its other end 117 being attached to the loose or relatively rotatable collar 114. The collar 114 is aperturated to receive a pin 118 fixed to the upper end of a lever 119, the latter being pivoted to rock on a pivot pin 120 supported by a bracket 120ᵃ fixed to one of the members 76, the lower end of this lever having a fork 121 thereon provided with rollers 122 which cooperate with a grooved portion 123 formed in one of the shiftable clutch members, as the clutch member 103 as shown. The opposite end of the shaft 110 is bent or otherwise provided with a lever 124 which is adapted to swing over an arcuate sector 125, this sector having recesses or notches 126, 127 and 128 therein in one or another of which the lever 124 may engage as the latter is swung into different positions corresponding respectively to the low speed or high speed drive of the feed conveyer through the jaw clutches previously described and when the lever 124 is in a central or neutral position both jaw clutches will be disengaged, and the sector is preferably provided with appropriate indications designating these different positions for the lever 124, as shown in Fig. 12. Swinging of the lever 124 into one or another of the positions referred to effects the speed changes by correspondingly shifting the rod 100 and the jaw clutch members 103 and 104 connected thereto. When the lever 124 is swung into position to engage in the recess 126 corresponding to low speed drive, the shaft 110 rotates in the appropriate direction, and acts, through the spring 115 to rotate the collar 114 in the same direction, this collar acting on the lever 119 to rock the latter in a direction to engage the jaw clutch member 103 with the jaw clutch member 90 attached to the relatively smaller sprocket wheel 86, thereby connecting it to the shaft 85, the other shiftable jaw clutch member 104 at this time being disengaged from the jaw clutch member 91 attached to the relatively larger sprocket wheel 87 so that the latter is then free to rotate independently on the shaft 85. When the lever 124 is swung into position to engage in the notch 127 in the sector, the shaft 110 is rotated in the appropriate direction and acting, through the spring 115, rotates the collar 114 in the same direction, said collar acting on the lever 119 to rock it in a direction to shift the rod 100 in a direction to disengage the jaw clutch member 103 from the jaw clutch member 90 attached to the relatively smaller sprocket wheel 86 and to shift the jaw clutch member 104 into driving engagement with the jaw clutch member 91 attached to the relatively larger sprocket wheel 87, the latter sprocket wheel being then connected to the shaft 85 to rotate therewith while the relatively smaller sprocket wheel 86 is disconnected from the shaft 85 so that it may revolve independently thereon.

When the lever 124 is swung into a middle position to engage in the notch 128 in the sector, it will rotate the shaft 110, spring 115 and collar 114 in a direction to swing the lever 119 into a mid-position, this lever than acting to bring the rod 100 into a middle position whereby the shiftable jaw clutch members 103 and 104 will be brought to positions where they are out of engagement with both of the jaw clutch members 90 and 91, and the sprocket wheels 86 and 87 will then both be disconnected from the shaft 85 so that the latter may rotate freely or idly without driving the feed conveyer. The spring 115 through which the selector shaft 110 operates the collar 114 to shift the shiftable jaw clutch members provides a yielding medium between the lever 124 and the jaw clutch shifting lever 119 whereby the lever 124 may be set immediately for high or low speed drive of the feed conveyer or in neutral position to stop the operation of the feed conveyer, while the machine is not in operation, and upon starting the machine into operation and the shaft 85 is driving either of the sprockets 86 or 87 so that the driving load on the respective jaw clutch resists unclutching thereof, the power stored in the spring 115 by the shifting of the lever 124 will act to disengage the engaged jaw clutch as soon as the driving load thereon is relieved, and the relieving of the driving load on the engaged jaw clutch is accomplished by means hereinafter described.

A coiled compression spring 129 interposed between a collar fixed on the shaft 110 and the bracket 111 serves to yieldingly retain the lever 124 in one or another of the notches or recesses in the sector 125.

Figure 3:
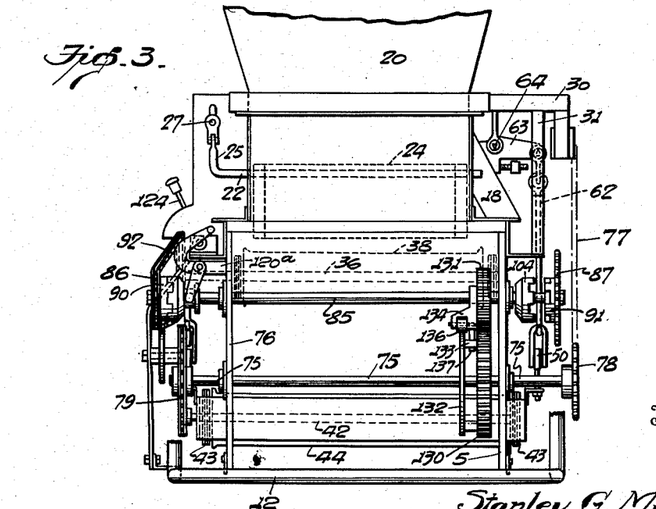
Figure 3 is an end elevation of the machine shown in Fig. 1 as viewed from the right hand end thereof.
Figure 4:
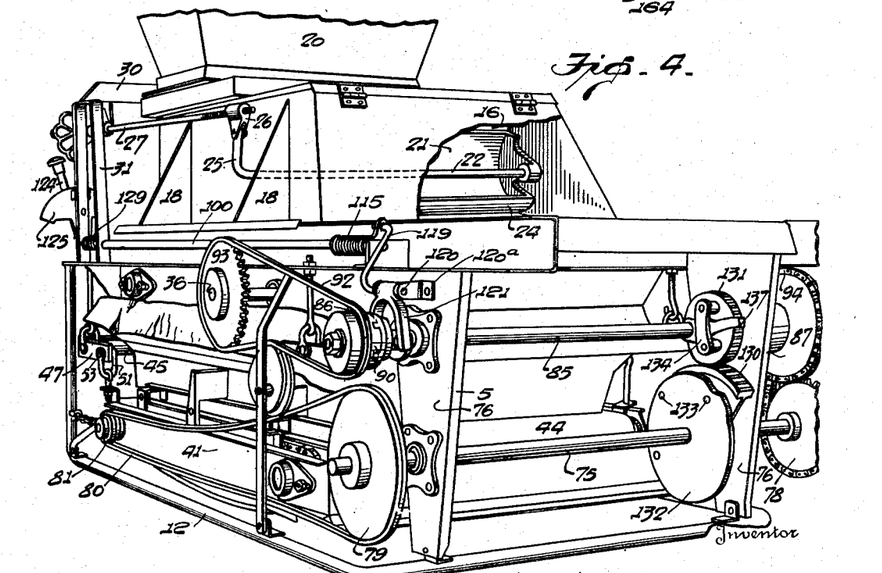
Figure 4 is a perspective view of the machine.
Figures 5, 6, 7, 8:
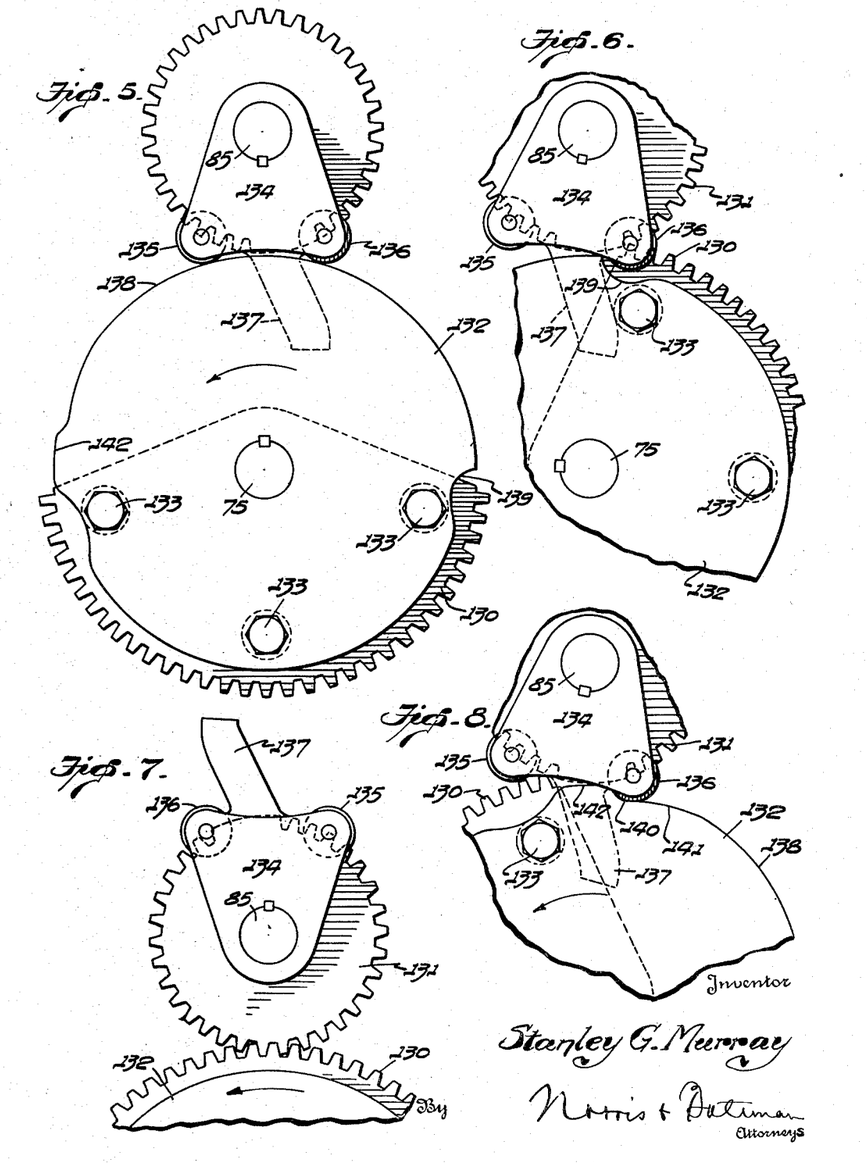
Figures 5, 6, 7 and 8 are detail views on an enlarged scale, showing the intermittent movement mechanism for the feeding conveyer at different stages in its operation.

The present invention provides novel and improved intermittent driving means between the continuously driven main shaft 75 and the intermittently driven countershaft 85, such intermittent driving mechanism being shown most clearly in Figs. 4 to 8 inclusive. It comprises a segmental or interrupted gear 130 which is keyed or otherwise fixed on the shaft 75 so as to revolve in unison therewith, a cooperating gear 131 keyed or otherwise fixed on the shaft 85 to rotate therewith, a disk 132 fixed to one side of the gear 130 as by bolts 133 so that this disk is offset laterally from said gear, and an arm 134 which is fixed to the gear 131 or to the shaft 85 so as to rotate therewith, this arm carrying a pair of rollers 135 and 136 located in the plane of the disk 132 so as to ride thereon and a tooth or finger 137 is fixed to the gear 131 and arm 134 to rotate therewith, this tooth or finger being located in a plane to operate in the space formed between the gear 130 and disk 132, as shown in Fig. 3. The portion of the disk 132 opposite to the untoothed portion of the gear 130 is formed with a cam surface 138 on its periphery which is concentric with the shaft 75, and the rollers 135 and 136 connected to the gear 131 are adapted to ride lightly on this cam portion 138 during a portion of each revolution of the shaft 75, as shown in Figure 5, said cam portion and cooperating rollers then locking the shaft 85 against rotation in either direction. The periphery of the disk 132 opposite to the first tooth of the gear 130 is provided with a depression 139 and the adjacent screw or bolt 133 is arranged to come into engagement with the tooth or finger 137 connected to the gear 131, slightly ahead of the engagement of the first tooth of the gear 130 with the gear 131, as shown in Figure 6. The engagement of the screw or bolt 133 with the tooth or finger 137 immediately prior to the engagement of the first tooth of the gear 130 with the gear 131 causes the load of the stationary shaft 85 and the feed conveyer connected thereto to be picked up by the finger 137, and since the finger 137 is of longer radius than the pitch line of the gear 131, this tooth or finger will pick up the load of the shaft 85 more effectively than would be done by the direct initial engagement of the teeth of the gears 130 and 131 and moreover, the engagement of this finger 137 and the cooperating bolt 133 will insure proper meshing of the gears 130 and 131 and will prevent jamming thereof. The engagement of the finger or tooth 137 by the bolt 133 sets the gear 131 and arm 134 into rotation, and the depression 139 in the disk 134 receives and accommodates the roll 136 during such rotation. After the gears 130 and 131 have been brought into mesh, the continued rotation of the gear 130 causes the gear 131 and shaft 85 to rotate, as shown in Figure 7, until said gear and shaft have completed a full revolution and have rotated somewhat in excess thereof, as shown in Fig. 8, the roller 136 entering a depression 140 formed in the disk 132, this depression having an incline 141 leading therefrom outwardly to the concentric locking portion 138. As the gear 130 continues to revolve, the inclined surface 141 of the disk 132 will act on the roller 136 to rotate the gear 131 and the shaft 85 backwardly to a slight extent, until such backward rotation is arrested by the engagement of the roller 135 with the portion 142 on the disk 133 which portion is concentric with the portion 138 of the disk.

The backward rotation thus imparted to the shaft 85, after completing each revolution, relieves the driving strain or load upon the jaw clutch on the shaft 85 which happens to be engaged, thereby permitting the power stored in the spring 115 on the selector shaft 110 to shift the rod 100 in response to a setting of the lever 124 for one or the other of the speed changes or for neutral. Accordingly, the lever 124 may be set by the attendant to either change the speed and consequently the extent of advance of the feed conveyer or to stop the operation of the feed conveyer, while the machine is in operation, and the change selected by the setting of the lever 124 will be effected automatically by the power stored in the spring 115 as soon as the driving force applied by the shaft 85 to one or the other of the jaw clutches is relieved. This feature of the present invention is particularly advantageous where a battery of the machines is employed for the mixing or blending of different materials in different proportions, it enabling the attendant to throw the shift levers of different machines into one or another of the desired positions when a change in the proportions or the materials to be mixed or blended is to be made, it being possible to set the shift levers of the different machines as desired while the machines are at a stand-still, and as soon as the machines are started up and the back-up motion takes place in the intermittent gear mechanisms to relieve the load strain on the jaw clutches, the jaw clutches of the different machines will be actuated automatically in accordance with the setting of the selector lever of each machine.

Figure 9:
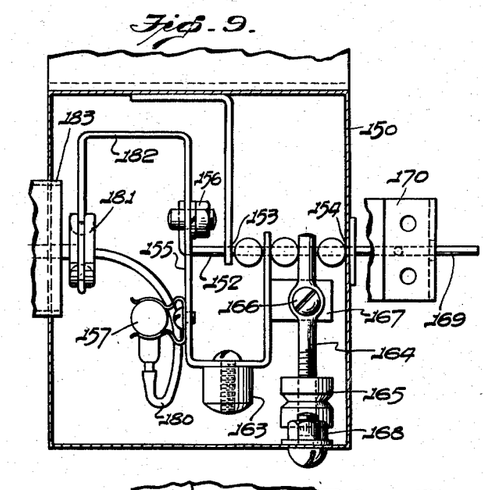
Figure 9 is a detail view on an enlarged scale of a part of the check weight indicating mechanism.

The weigh conveyer check weighs the loads individually as they are delivered thereto by the feed conveyer, and means is provided for indicating whether the loads are of the proper predetermined weight or are overweight. Such indicating means, shown most clearly in Figs. 9, 10 and 19, comprises a box 150 which may be supported on the cross member 30 of the main frame adjacent to the outer or free end of the long arm 65 of the scale beam. This box has a shaft 152 mounted to rotate therein in bearings 153 and 154 and this shaft has a disk 155, of aluminum or light weight fixed thereto as by a clamp 156 which secures a bent end of said shaft. The disk 155 carries a mercury switch 157, which may be of any suitable type, composed for example of a glass or other envelope 158 containing a body of mercury 159, this switch having a set of three contacts 160, 161 and 162 therein, arranged so that as the switch is rocked into different positions about the axis of the disk 155, the body of mercury may bridge the contacts 160 and 161, or the contacts 160 and 162. The shaft 152 and disk 155 thereon are freely rotatable in the bearings 153 and 154, although the switch 157 is mounted on the disk 155 below its axis of rotation so that it tends to rotate the disk 155 into a position where the switch is in its lower position. A weight 163 may also be attached to the lower portion of the disk 155 to assist in holding it normally in the position stated. A pendulum 164 is suspended loosely or rotatably from the shaft 152, this pendulum having a weight 165 which is adjustable vertically thereon. The pendulum carries an adjusting screw 166 which is located in the path of a lug 167 attached to the disk 155. A suitable stop 168, which may be in the form of a nut as shown, is fixed in the bottom of the box 150 in the path of the weight 165 on the pendulum so that it will normally support the pendulum in an inclined position with the screw 166 thereon out of contact with the lug 167 on the disk 155. The shaft 152 extends to the outside of the box 150 and is bent to form a crank 169 which is engageable in a fork 170 attached to the outer or free end of the weighted scale beam arm 65.

Figure 10:
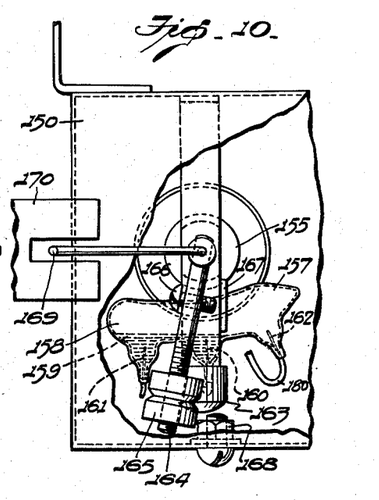
Figure 10 is an elevation, partly in section, of the structure shown in Fig. 9 as viewed from the right in that figure.

Normally, when no load or short load is contained on the weigh conveyer, the weighted scale beam arm 65 will be in lowered position and the fork 170 will depress the crank 169 and thereby tilt the mercury switch 157 into a position where the body of mercury 159 therein will be at one end of the switch and will not bridge any of the contacts therein, the pendulum 164 then resting against the stop 168 and the lug 167 being retracted from the screw 166. When the weigh conveyer contains a full or complete load, the scale beam arm 65 rises under its influence and in so doing the fork 170 acts on the crank 169 to rotate the disk 155 and the mercury switch thereon, and if the load on the weigh conveyer is correct and the scale beam balances, the mercury switch will rock into a position where the body of mercury 159 therein bridges the contacts 160 and 161. When the scale beam comes to a poise or balance for a load of correct weight, the pendulum 164 still rests against the stop 168 and the screw 166 is so adjusted that it will not be engaged by the lug 167, as shown in Fig. 10. If, however, the load on the weigh conveyer is too heavy or in excess of the predetermined weight desired, the scale beam arm 65 swings upwardly above its balanced or poised position, causing the fork 170 thereon to swing the crank 169 upwardly thereby rotating the disk 155 and consequently rocking the mercury switch sufficiently far to cause the body of mercury 159 therein to flow toward the other end of the switch and to bridge the contacts 160 and 162 therein. Such further rocking of the mercury switch under the influence of a heavy or overweight load on the weigh conveyer, brings the lug 167 connected to the disk 155 against the screw 166, thereby causing the pendulum 164 to be lifted away from its stop 168. The pendulum 164 will thereby avoid any influence upon the weighing movements of the scale beam in coming to a balance in response to loads of the correct weight on the weigh conveyer, but when a load of excess weight is on the weigh conveyer, it will yield under the influence thereof. By adjusting the weight 165 vertically on the pendulum, the amount of excess weight required to rock the switch into position to close a circuit between the contacts 160 and 162 may be readily varied, as desired. The weight of the switch 157 and also the weight 163 if used will automatically rotate the disk 155 back to its normal position when permitted by the movement of the scale beam, the unbalanced condition of this disk however being slight so that it will not impede appreciably the movements of the scale beam.

The mercury switch controlled in the manner just described is employed to operate suitable indicating means. Preferably and as shown in the present instance, such indicating means comprises a pair of incandescent electric lamps 175 and 176 which are controlled by the switch contacts 161 and 162 respectively. These lamps for example are shown in the present instance as connected by a common conductor 177 to one terminal of a battery B or other suitable source of electric current supply, the other terminal of the battery being connected by a conductor 178 to the central terminal 160 of the switch, the other terminal of the lamp 175 being connected by a conductor 179 to the switch contact 161 and the other terminal of the lamp 176 being connected by a conductor 180 to the switch contact 162. The lamps may be of different or distinctive colors, the lamp 175 for example being green and the lamp 176 red. Accordingly, when the switch 157 is in its normal position and the scale beam 65 is lowered, as when no load is on the weigh conveyer, the body of mercury 157 will be at one end of the switch, and no circuit will be closed through either lamp. When a load of the proper weight is on the weigh conveyer, the scale beam comes to a poise under the influence thereof, thereby rocking the switch 157 into a position to cause the body of mercury therein to bridge the contacts 160 and 161, thereby completing the circuit through the lamp 175 which then lights, showing for example a green light, which indicates that the load is of the proper or predetermined weight. When a load of excess weight is on the weigh conveyer, the upward swing of the scale beam rocks the switch 157 sufficiently to cause the body of mercury therein to bridge the contacts 160 and 162, thereby closing the circuit through the lamp 176 and thus causing this lamp to light and showing for example a red light which indicates that the load is overweight. If a load reaches the weigh conveyer which is underweight, the scale beam will not be lifted sufficiently to rock the switch 157 to an extent to cause the body of mercury therein to complete either lamp circuit, and the lack of a signal light under such conditions, would inform the attendant that the load on the weigh conveyer is underweight.

The conductors, which are flexible, are preferably led from the contacts of the switch through an insulating ring 181 which is carried on an arm or extension 182 attached to the disk 155, the insulating ring being concentric with the shaft 152 about which the disk 155 and switch 157 rotate as an axis, and the conductors are led out of the box 150 through a tube 183 which is concentric with the insulating ring 181 and is parallel with the knife edges of the scale beam, such arrangement of the switch conductors minimizing any detrimental influence thereof upon the sensitiveness of the scale beam.

Indicator cards 185, Fig. 21, are preferably provided to facilitate the setting of the machine for the measuring and weighing of loads of different weights. A number of these cards may be provided, one for each of various kinds of material to be measured and weighed and conforming with the different specific gravities of such materials. Each card is adapted to be inserted into a card holder 186 which is preferably supported on the pivoted bearing 28 in which the rod 27 is journaled so that it will remain in parallelism with said rod as the latter swings about the pivot 29, and the lower edge of the card holder rests in a slot in a pointer 187 which is threaded on the feed gate adjusting shaft 27. Each card, which may bear a designation of the kind of material to which it pertains, also bears a scale 188 with which the pointer 187 cooperates, this scale indicating to the attendant the correct setting of the feed gate 21 in order to set the machine to measure and weigh loads of different weighs, as may be indicated by the scale 189. These cards may bear indications on both sides pertaining to loads which vary considerably in weight, and each side of the card bears a designation as to whether the lever 124 is to be set for high gear or low gear.

These indicator cards are particularly advantageous when a number of machines are to be used for blending or mixing predetermined proportions of materials for example according to food or chemical value, it enabling materials to be blended in predetermined numbers of pounds to the ton. The weight designations 189 on the cards indicate the positions the poise 66 is to be set on the scale beam 65 to check weigh the loads of different weights. By this arrangement, the proportions of the different materials will remain constant after the machines have been set irrespective of the number of loads measured and weighed per minute by the machine, the gross tonnage of the machines being dependent upon the speed at which the machines are driven.

Figure 14:
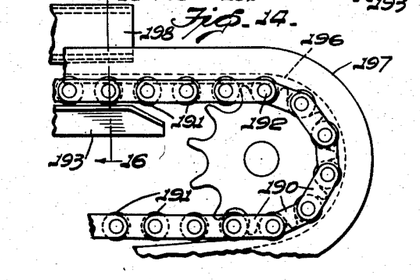
Figure 14 is a detail view showing in elevation the end portion of one of the conveyers.

The feed and weigh conveyers employed are preferably of the novel construction shown in Figs. 14 to 16 inclusive. As shown in these figures, each conveyer comprises a pair of endless chains 190 of equal length mounted to travel over the respective pairs of sprocket wheels on the shafts 36 and 42 respectively. Each chain embodies rollers 191 which are revoluble on the pivots 192 connecting the links of the chain, these rollers being arranged to ride on rails 193 which are suitably fixed in the respective conveyer frame so that they support the upper stretch of the respective conveyer in flat horizontal position. The pivots 192 of the chains extend inwardly to form pegs 194, the pegs of the opposite chains being alined, and tube spacers 195 are revolubly mounted on the alined pegs and extend between the chains. The conveyer belt 196, which may be composed of a strip of canvas, rubber or other suitable flexible material, is extended loosely around the series of tube spacers and laced or otherwise joined at its ends, the longitudinal edges of the belt being provided with upturned flanges 197 to prevent spilling of the material over the longitudinal edges of the belt. By this construction, the driving sprockets of the respective conveyer will pull the chains and the belt will travel with the tube spacers. The roller chains travel upon the tracks 193, these tracks and tube spacers supporting the upper stretch of the belt without the necessity of providing idlers, a perfectly reliable and flat surface being maintained beneath the adjustable feed gate 21, thus insuring accuracy in the volumetric measurement of the load withdrawn from the feed hopper 2 at each operation of the feed conveyer. Guides 198 preferably of stainless steel suitably fixed to the rails 193 and extending the full length of the upper run of the conveyer belt prevent side creeping of the belt so that jamming of the belt or damage thereto from such cause is avoided, and since the belt is supported by the tube spacers rather than by rollers or pulleys, no difficulty arises due to the accumulation of dusty materials beneath the belt as would be likely to occur if the belt were supported by rollers or pulleys. The tube spacers support the belt so that it becomes in effect a traveling platform which is carried along by the tube spacers, and since both the belt and the chains are run slack and the belt is slightly slacker than the chain, as indicated in Fig. 14, the conveyer constructed as shown and described consumes very little power for its operation. These considerations are of particular importance where, as in the present instance, the conveyer is relatively wide and the outlet of the feed hopper 2 is of correspondingly great width in order to afford large capacity for the machine.

The operation of a measuring and weighing machine constructed as hereinbefore described is as follows:—

Assuming the feed hopper 2 is supplied by the bin 20 with material of the kind to be measured and weighed and that the appropriate card for such material has been inserted into the card holder 186, the hand lever 28 is rotated in the appropriate direction to bring the pointer 187 on the screw shaft 27 into register with the proper designation on the scale 188 to adjust the feed gate 21 in the proper position for the measurement of such material, and the weight 66 on the scale beam 65 is set in the proper position thereon as indicated by the scale card to check weigh loads of predetermined or desired weight of such material as measured by the feed conveyer. The lever 124 is also set to engage the low speed or high speed clutch 103 or 104, according to the weight of the loads to be measured and check weighed.

Assuming also that the drive shaft 75 is driven continuously from an appropriate source of power as by the chain 77 and sprocket wheel 88, the intermittent gearing comprising the gears 130 and 131, disk 132 and finger 137 will operate, during each revolution of the shaft 75, to rotate the shaft 85 through a revolution and then bring the latter shaft to rest. Each revolution of the shaft 85 drives the feed conveyer 30 in a direction to move the upper stretch thereof toward the right in Fig. 1, through a predetermined or definite distance as determined by the engagement of the low or high speed clutch member 103 or 104. Such travel or advance of the upper stretch of the feed conveyer causes a layer of material to be carried from beneath the open bottom feed hopper 2 immediately above this conveyer, the depth of the layer of material so withdrawn from the feed hopper being determined by the adjustment of the feed gate 21 at the outlet of the hopper, and the material so withdrawn from the hopper by the feed conveyer flows by gravity over the right hand end of the feed conveyer (Fig 1) on to the upper stretch of the weigh conveyer 44, the upper stretch of the weigh conveyer being caused to travel continuously in an opposite direction to the travel of the upper stretch of the feed conveyer, by the chain 80 driven from the sprocket wheel 79 on the continuously revolving shaft 75.

After the feed conveyer has been advanced through a definite distance to deposit a measured or volume of material on to the weigh conveyer, the advance of the feed conveyer is interrupted by the intermittent gearing, in the manner hereinbefore described, but the weigh conveyer, which travels continuously during the operation of the machine, carries the material received by it toward the left in Fig. 1, the extent of travel of the weigh conveyer, after receiving each load or charge of material from the feed conveyer, being sufficient to receive the full load or charge before any portion thereof is discharged from the weigh conveyer, and while each load or charge is contained on the weigh conveyer, it is weighed by the weighing mechanism which supports the weight conveyer. If the load on the weigh conveyer is of the predetermined weight desired, the scale beam 65 will rise and come to a poise, and in so doing the fork 170 thereon will act on the crank 169 and will rotate the disk 155 and thereby rock the mercury switch 157 thereon to cause the body of mercury 159 in this switch to flow from its normal position at one end of the switch to a position where the mercury bridges the contacts 160 and 161, the circuit thus completed by the body of mercury through these contacts closing the circuit through the indicator lamp 175, which will then become lighted and may show for example a green light which indicates that the load on the weigh conveyer is of the correct weight. As the disk 155 is rotated into a position to close the circuit between the contacts 160 and 161 coincident to the movement of the scale beam 65 to a poise position, the lug 167 connected to the disk 155 does not come into contact with the screw 166 so that the pendulum 164 will not be lifted from its stop 168, it being understood that the screw 166 is properly set to effect this result, as shown in Fig. 10. However, if a load received by the weigh conveyer is overweight or too heavy, the weighing mechanism supporting the weigh conveyer will swing the scale beam 65 past its poised position and to an upper or raised position. The fork 170 on this scale lever will then act on the crank 169 to rotate the disk 155 beyond the position shown in Fig. 10, if the amount of excess weight of the load exceeds a predetermined limit determined by the adjustment of the weight 165 of the pendulum 164, and the lug 167 will then engage the screw 166 and lift the pendulum away from the stop 168 and the switch 157 will be rotated or rocked sufficiently far to cause the body of mercury 159 therein to flow to the other end of the switch and to bridge the contacts 160 and 162, thereby completing the circuit through the indicator lamp 176 and causing this lamp to become lighted. This lamp will show for example a red light which indicates to the attendant that the load on the weigh conveyer is too heavy or is in excess of the predetermined weight desired. On the other hand if a load on the weigh conveyer is light or is less than the predetermined weight desired, the scale beam 65 under the weight influence of such load will not rise to its poised position so that the disk 155 will not be rotated sufficiently to cause the body of mercury 159 to flow into a position to bridge the contacts 160 and 161, in which event neither of the indicator lamps 175 or 176 will be lighted and such will indicate to the attendant that the load on the weigh conveyer is light or is of less than the predetermined weight.

If the indicator lamp 176 lights showing that a load on the weigh conveyer is heavy or in excess of the predetermined weight, the attendant rotates the hand wheel 28 in the appropriate direction to lower the feed gate 21 and thereby diminish the depth of the layer of material on the feed conveyer until the lamp 176 ceases to light and the lamp 175 lights at each weighing operation, it being understood that such adjustment of the feed gate is effected while the machine continues in operation. Similarly, if neither of the lamps 175 or 176 lights, thus informing the attendant that the load on the weigh conveyer is light or of less than the predetermined weight, the hand wheel 28 is rotated to raise the feed gate 21 and thereby increase the depth of material on the feed conveyer until the lamp 175 lights, thus informing the attendant that the load on the weigh conveyer is of the proper or predetermined weight, and this adjustment likewise may be made while the machine continues in operation. The adjustment of the feed gate thus enables the volume of material delivered by the feed conveyer to the weigh conveyer to be reduced or enlarged according to whether the preceding load is found to be too heavy or too light. Each load after being weighed on the weigh conveyer is discharged therefrom through the delivery chute 70 into a conveyer or other means which removes the material from the machine and may mix the materials from different machines when a number of the machines are employed for blending different materials. Because of the intervals between the loads on the weighing conveyer, the scale beam rises and falls in synchronism with the operations of loading and discharging the weigh conveyer, thus indicating a balance at each cycle of the machine if properly adjusted and enabling the attendant to readily adjust the machine if the loads measured by the feed conveyer are too light or too heavy.

The adjustment provided for the feed gate 21 enables loads varying considerably in volume and weight to be measured and check weighed. However, when it is desired to measure and check weigh loads which vary greatly in volume and weight, the extent of advance of the feed conveyer and consequently the volume of material delivered thereby to the weigh conveyer may be varied within relatively wide limits by engaging the low speed or high speed clutch member 103 or 104 whereby the ratio of speed transmission between the shaft 85 and the feed conveyer is varied. Such adjustment of the machine is effected by swinging the hand lever 124 into the low speed or high speed notch 126 or 127 of the sector 125, such adjustments of this hand lever effecting engagement of the clutch member 103 or 104 with the cooperating clutch member 90 or 91. Such adjustment of the hand lever 124 can be made while the machine is standing idle or not in motion in any position. If it happens that the driving load at the time is on the engaged clutch, the swing of the hand lever 124 will store power in the spring 115 although the driving load on the engaged clutch may prevent its disengagement and as soon as the machine is started into operation the intermittent gearing will operate until the shaft 85 completes a revolution and is then rotated slightly in a backward direction as hereinbefore described, such backward rotation of the shaft 85 relieving the engaged clutch of the driving load so that its shiftable clutch member will immediately disengage from its cooperating clutch member under the power stored in the spring 115 and this spring will act to engage the other shiftable clutch member with its cooperating clutch member. If it is desired to discontinue the measuring of loads in the machine, it is only necessary to swing the hand lever 124 into engagement with the neutral notch 128 in the sector 125. Such movement of the hand lever 124 acts through the spring 115 to disengage both shiftable clutch members 103 and 104 from their cooperating clutch members, and if the engaged shiftable clutch member happens to be under the driving load at the time, the spring 115 will automatically disengage it as soon as the machine is started and the driving load is relieved by backward rotation of the shaft 85 upon completion of its revolution.

The means thus provided for altering the distance through which the feed conveyer advances to measure each load, when loads of greatly increased or reduced volume and weight are to be measured and check weighed, is particularly advantageous when a battery of the machines is employed for measuring and check weighing loads of different materials for mixing in predetermined proportions, it enabling the attendant to set the hand shifting levers in either low, high or neutral position in the different machines to meet requirements, while the machines are at rest, and as soon as the battery of machines is started up, the machines will be set in the condition determined by the setting of the respective hand levers.

The present invention provides a novel machine capable of rapidly and accurately measuring predeterminable loads of material and of check-weighing the measured loads. By advancing or traveling the feed conveyer intermittently each time through a definite distance, loads of predetermined volume are measured, and by delivering the measured loads, one at a time, on the continuously traveling scale-supported weigh conveyer, the latter operates to check-weigh each load before any portion of any single load is discharged from the weigh conveyer.

The adjustable feed gate enables the depth of the stream or layer of material delivered by the feed conveyer to be readily adjusted to effect the measurement of loads of different volumes or weights, as desired, and to correct any inaccuracy in the volume of the loads and the weight thereof, and the variable speed drive for the feed conveyer enables the attendant to set the machine at will to measure loads of widely different volumes, as desired.

The indicating means associated with the weigh conveyer provides means for informing the attendant during the operation of the machine, whether the measured loads are of the predetermined weight desired or are over-weight or under-weight, so that the feed gate may be adjusted to bring the measured loads to the proper or predetermined weight, and such adjustment may be made quickly and conveniently while the machine continues in operation. The indication of the weight of each load on the weigh beam and adjustment of the feed gate to reduce or enlarge the volume of the loads measured by the feed conveyer, according to whether a preceding load on the weigh conveyer is too heavy or too light, are made possible since the intermittent gearing between the drives for the feed and weigh conveyers provides definite intervals between the loads on the weigh conveyer so that each load thereon may be accurately and individually weighed and the scale beam may assume a position during each such interval corresponding to the weight of each load on the weigh beam, and hence unreliable indication as to the correctness or incorrectness of the individual loads is avoided.

The machine when once set and placed in operation will deliver loads of the correct volume and weight with great regularity, the number of measured and weighed loads or charges delivered during a given period of time depending on the speed at which the machine is driven, and the machine will function properly whether it is driven at high or low speed.

The adjustment provided for the feed gate enables the feed conveyer to deliver a thin or thick stream or a stream of any intermediate depth and of short length, and the variable speed drive for the feed conveyer enables a thin or thick stream or a stream of any intermediate depth and of a relatively longer length to be delivered, so that the machine is capable of being set to measure and check-weigh loads the volumes and weights of which may be made to vary as desired through a relatively wide range, and even further variations in the volumes and weights of the loads may be readily made, if desired, by employing sprocket wheels of different sizes for driving the feed conveyer.

The shifting means provided for changing the distance through which the feed conveyer is advanced in measuring each load or for setting the feed conveyer drive in neutral so that it does not operate is particularly advantageous when a battery of the machines is employed for mixing or blending different materials in predetermined proportions. It enables the attendant to reset any or all of the machines to measure and check-weigh loads of different volumes and weights for blending in different proportions as may be desired, while the machines are at rest or before any of the machines are started, the resetting of the machines taking place promptly and as soon as the machines are started, so that the machines will immediately commence to measure and check-weigh the loads correctly according to the resetting thereof. When it is desired to stop the delivery of material from any machine, it is only necessary for the attendant to set the control lever for such machine in neutral, the feed conveyer for such machine being thereby disconnected from its driving means so that its feed conveyer does not advance and hence such machine will not deliver any material.

By combining in the same machine means for measuring the loads and means for check-weighing the measured loads, the measuring and check-weighing of the loads are performed with minimum handling or while the material is passing once through the machine, and the cooperative means provided for increasing or reducing the volume of the measured loads according to whether a preceding load is too light or too heavy, insures the delivery of loads of a predetermined weight.

I claim as my invention:—

1. In a machine of the class described, the combination of a feed conveyer, a cooperative weigh conveyer to receive and weigh loads of material therefrom, means for advancing the feed conveyer through a definite distance independently of the weighing operation of the weigh conveyer to measure volumetrically a predetermined quantity of material, and means for varying the volume of the loads measured by the feed conveyer.

2. In a machine of the class described, the combination of a feed conveyer, a cooperative weigh conveyer to receive material therefrom, means for advancing the feed conveyer independently of the weighing operation of the weigh conveyer to measure volumetrically predetermined loads of material, means for ascertaining the quantity of material in the loads thus measured, and means for varying the volume of the loads measured by the feed conveyer.

3. A measuring and weighing machine comprising a feed conveyer, a weigh conveyer, means for moving the feed conveyer intermittently through a predetermined constant distance to measure loads of material volumetrically independently of the weigh conveyer and deliver them to the weigh conveyer, and means for varying the volume of the loads measured by the feed conveyer according to whether a preceding load on the weigh conveyer is too light or too heavy.

4. A measuring and weighing machine comprising a feed conveyer, a scale-supported weigh conveyer, means for advancing the feed conveyer intermittently through a constant definite distance independently of the weighing operation of the weigh conveyer and for advancing the weigh conveyer continuously whereby the feed conveyer will measure loads of material of predetermined volume and deliver them to the weigh conveyer, means for determining whether the measured loads delivered to the weigh conveyer are over or under a predetermined weight, and means for reducing or enlarging the load measured by the feed conveyer if a preceding load is over or under a predetermined weight.

5. A machine of the class described comprising a feed conveyer having means for supplying material thereto, a cooperative weigh conveyer to weigh said material, means for advancing the feed conveyer through a definite distance independently of the weighing operation of the weigh conveyer to form a layer of material thereon and deliver a measured volume thereof to the weigh conveyer and means for increasing or decreasing the depth of the layer of material on the feed conveyer.

6. A measuring and weighing machine comprising a feed conveyer having means for supplying material thereto, a weigh conveyer to receive and weigh said material, and means for intermittently advancing the feed conveyer to a definite extent independently of the weighing operation of the weigh conveyer to volumetrically measure loads of material of predetermined volume and deliver such loads to the weigh conveyer and to advance the weight conveyer continuously to advance the loads while determining whether they are above or below a predetermined weight.

7. A measuring and weighing machine comprising a belt conveyer having a hopper for supplying material thereto, a weigh conveyer to weight said material, means for advancing the belt conveyer intermittently through a definite distance independently of the weighing operation of the weigh conveyer to form a layer of material thereon and to measure a predetermined load of such material and deliver it to the weigh conveyer, and a feed gate cooperative with the supply hopper adjustable to vary the depth of the layer of material formed on the belt conveyer.

8. A measuring and weighing machine comprising a belt conveyer having a hopper for supplying material thereto, a weigh conveyer to receive and weigh said material, means for advancing the belt conveyer intermittently through a definite distance independently of the weighing operation of the weigh conveyer to form a layer of material thereon and to measure volumetrically a predetermined load of such material and deliver it to the weigh conveyer, a feed gate controlling the depth of the layer of material formed on the belt conveyer, means for adjusting said gate to vary the depth of the layer of material on said belt conveyer, and an indicator card cooperative with said gate adjusting means and bearing indications of the adjustments of the gate according to loads of different weights.

9. A measuring and weighing machine comprising a weigh conveyer, a feed conveyer operative intermittently through a constant distance to measure volumetrically predetermined loads of material independently of the weigh conveyer and deliver them to the weigh conveyer, and means responsive to the weight of the loads on the weigh conveyer for indicating the correctness of the weight of the loads.

10. A measuring and weighing machine comprising a weigh conveyer, a feed conveyer operative intermittently through a constant distance to measure volumetrically predetermined loads of material independently of the weigh conveyor and deliver them to the weigh conveyer, indicating means responsive to the weight of the loads on the weigh conveyer for indicating whether a load equals or exceeds a predetermined weight, and means for governing the operation of the indicating means to indicate excess weight of the load.

11. A measuring and weighing machine comprising a feed conveyer, a weigh conveyer to receive and weigh loads of material, and driving means for advancing the feed conveyer intermittently through a constant distance independently of the weighing operation of the weigh conveyer to measure volumetrically loads of material and deliver them to the weigh conveyer, said driving means including means for varying the extent of advance of the feed conveyer at each operation to measure loads of different volumes.

12. A measuring and weighing machine comprising a feed conveyer, a weigh conveyer to receive material therefrom, and driving means for advancing the feed conveyer intermittently to measure loads of material and deliver them to the weigh conveyer, said driving means embodying variable speed devices having clutches for selectively rendering them operative and intermittent gearing for driving the feed conveyer having means for relieving the driving load on said clutches to permit disengaging thereof.

13. A measuring and weighing machine comprising a feed conveyer, a weigh conveyer arranged to receive material therefrom, driving means for advancing the feed conveyer at different ratios, clutches controlling said driving means, intermittent gearing for driving said driving means through said clutches, said intermittent gearing embodying means for relieving the driving load on one or another of the clutches upon completion of each operation thereof, and a selecting device for the driving means embodying means operative yieldingly to disengage one or another of said clutches when relieved of the driving load thereon.

14. A measuring and weighing machine comprising a feed conveyer having means for supplying material thereto, a weigh conveyer arranged to receive material from the feed conveyer, driving means for advancing the feed conveyer intermittently to measure charges of material and deliver them to the weigh conveyer and for advancing the weigh conveyer continuously to advance the charges while weighing them, said driving means embodying gearings of different ratios connected to the feed conveyer, clutches controlling the respective gearings, a drive shaft connected to the weigh conveyer, intermittent gearing between said drive shaft and clutches for driving the latter, said intermittent gearing embodying means for relieving said clutches of driving load upon completion of each operation, and a selecting device for said different ratio gearings connected to said clutches and embodying means for holding it in one or another set position and means for automatically operating said clutches when the driving load thereon is relieved.

15. In a machine of the class described, the combination of a main frame, a weigh conveyer embodying an endless travelling belt having shafts supporting it and weighing mechanism on which the belt and its shafts are mounted in said frame, a drive shaft mounted on said frame at an end of the conveyer and having an endless driving member connecting it to one of the conveyer shafts, and a drag link movably connecting the conveyer to said frame and extending in substantial parallelism to said endless driving member.

16. In a machine of the class described, the combination of a feed conveyer having means for supplying material thereto, a drive shaft, and means for intermittently advancing said conveyer to measure loads of material comprising an interrupted driving gear on the drive shaft, a cooperating driven gear connected to said conveyer, and members on said gears engageable prior to the engagement of the teeth of said gears to initiate the movement of the driven gear by the driving gear.

STANLEY G. MURRAY.